2 Sheets—Sheet 1.

E. J. SUMNER,

Assignor to J. J. CURRAN, I. & M. WOLFF.

Lumber Drier.

No. 9,309. Reissued July 20, 1880.

Witnesses:
A. E. Tale
A. H. Morey

Inventor:
Eli J. Sumner
B. G. L. Chapin
Atty.

2 Sheets—Sheet 2.

E. J. SUMNER,

Assignor to J. J. CURRAN, I. & M. WOLFF.

Lumber Drier.

No. 9,309. Reissued July 20, 1880.

Witnesses:
A E Tate
A H Morey

Inventor:
Eli J Sumner
By G L Chapin
Atty

UNITED STATES PATENT OFFICE.

ELI J. SUMNER, OF MOORESVILLE, INDIANA, ASSIGNOR TO JOHN J. CURRAN AND ISAAC AND MAX WOLFF.

LUMBER-DRIER.

SPECIFICATION forming part of Reissued Letters Patent No. 9,309, dated July 20, 1880.

Original No. 125,098, dated March 26, 1872. Application for reissue filed October 28, 1879.

*To all whom it may concern:*

Be it known that I, ELI J. SUMNER, of Mooresville, Morgan county, State of Indiana, have invented certain Improvements in Kilns for Drying Lumber, of which the following is a specification.

My invention relates to that class of drying-kilns in which steam is used for the purpose of producing heat.

The nature of the invention consists in the construction, combination, and arrangement of the devices hereinafter described.

Figure 1:
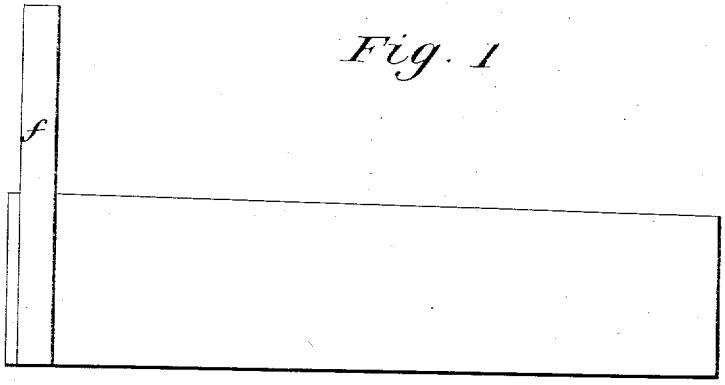
Figure 2:
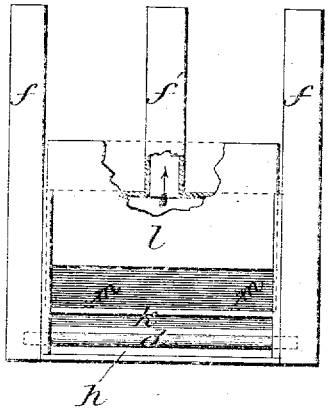
Figure 3:
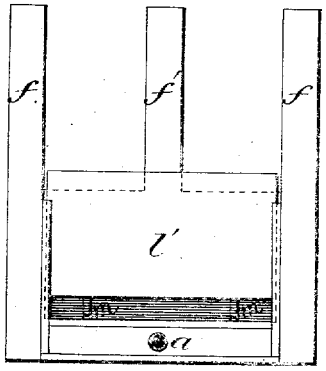
Figure 4:
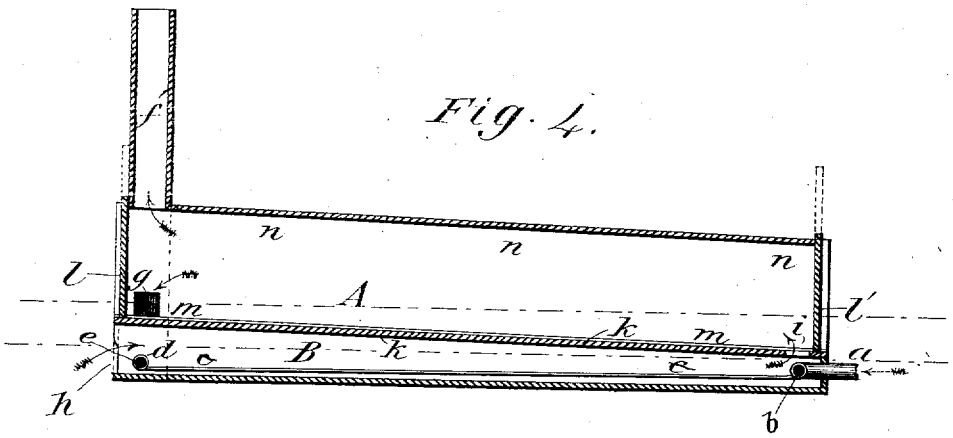
Figure 5:
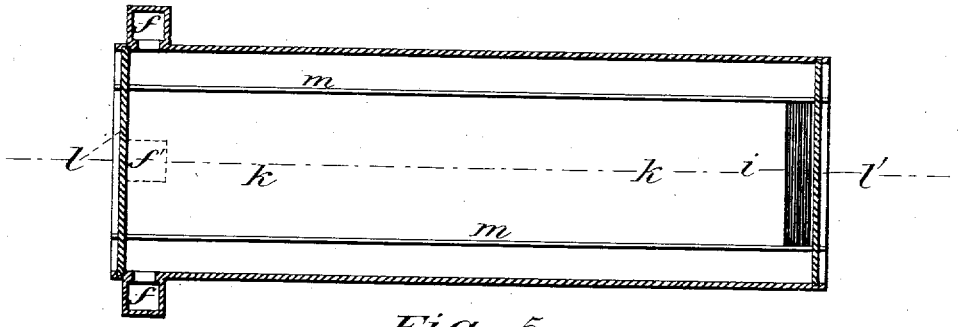
Figure 6:
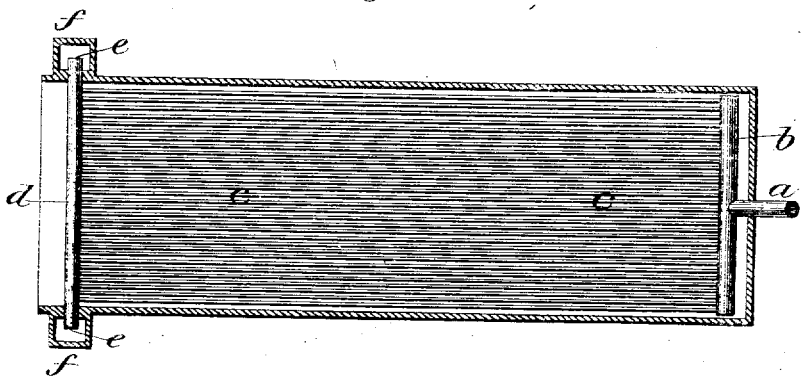

Figure 1 is a side elevation of the kiln. Fig. 2 is a front elevation of the same. Fig. 3 is a rear elevation; Fig. 4, a vertical longitudinal section; Fig. 5, a plan of the floor and track; Fig. 6, a ground plan, showing the heating apparatus.

The original drawings are on the scale of one-eighth of an inch to the foot.

This kiln is an oblong building of the shape represented in Figs. 1, 2, and 3. Running through it horizontally is a floor, (represented by K of Fig. 4.) This floor divides the heating-chamber B from the drying-room A, the drying-room being above and the heating-chamber below. Upon this floor rests a track, represented by *m*.

The heating apparatus, which is in the chamber below the floor K, consists of a series of tubes conveying steam. *a* is the entry through which the steam is conveyed to *b*. From *b* the steam enters a series of small tubes, (represented by C, Figs. 4 and 6,) and through them finally reaches the tube *d*, from which it escapes into the air-draft *f* at *e*. These air-drafts consist of hollow rectangular prisms, represented by *f* of Figs. 1, 2, 3, and 4. The steam escaping from the pipes *d* and rising through these produces a very considerable draft.

The air which is to do the drying is let into the kiln at the register *h*, and, impinging upon the pipes C, is heated. This current entering the kiln at *h* necessarily first reaches the cooler part of the pipe next to *d*. As it passes along on and around the pipes C it will come to warmer and warmer parts until it is sufficiently heated, when it passes upward through an opening at *i* in the floor, and passing through the drying-room to the air-drafts *f f* it is partly received into them at *g*, and at the same time passes partly out through the air-draft *f'*, and is discharged into the outer atmosphere, carrying with it all the vapor collected from the material being dried.

The air-draft *f'* communicates with the kiln by means of a hole in the top of the kiln on which it rests, as is represented in Fig. 2.

By means of these devices so arranged a current of steam is constantly running through the pipes from *a* to *e*, and a current of air through the heating-chamber from *h* to *i*, each in an oppposite direction to the other. In this way, while the temperature of the steam-pipes is kept up, the air is constantly heated sufficiently before it enters the drying-room, and the difference of temperature of the pipes and the air is constantly maintained.

In the drying-room is the track *m*, which is a little inclined, the highest part being near the air-drafts *f*. This track is to be continued outside of the kiln both ways, and upon it are to be placed convenient cars, upon which the article to be dried is to be placed.

To prevent the air from passing over, the curtains *n* are hung from the ceiling of the drying-room to the top of the pile on the cars. Now, if the kiln be filled in this way, the current of air, moving as described, will pass from *i* through the open spaces of the material and pass out through *f* and *f'*. As this air has been heated, as before described, it will evaporate and carry away with it all moisture it meets on its way, and if the current be continued long enough will dry fully any articles, such as lumber and the like, which may be in the kiln.

The heat may be supplied either by exhaust steam or live steam under pressure.

The contents of the car next to *i* will be first dried, and by opening the door *l'* may be easily rolled out of the kiln. This door is then closed, and the whole train so moved that the next car will come up to *i*. The door *l* is then opened, and a car, which has been loaded on the track outside, rolled in. This door is now closed, and the drying process will continue as before.

In this way the contents of the kiln may be from time to time removed without impeding the drying process.

I claim and desire to secure by Letters Patent—

1. The floor K, in combination with the register *h*, the tubes C, the opening *i*, the opening *g*, and the air-drafts *f* and *f'*, all being arranged and used substantially as set forth.

2. The cold-air draft or register *h* at the front of the pipe-compartments and the hot-air opening *l* at the rear of the drying-room, in combination with the steam-pipes C, for heating the cold air in its passage from *h* to *i*, as and for the purpose set forth.

ELI J. SUMNER.

Witnesses:
G. L. CHAPIN,
A. G. MOREY.